United States Patent
Yamamoto (10) Patent No.: US 7,796,874 B2
(45) Date of Patent: Sep. 14, 2010

(54) IMAGING SYSTEM WITH MECHANICAL AND ELECTRICAL ANTI-SHAKE MODE DETERMINED ACCORDING TO REMAINING AVAILABLE CHARGE OF POWER SOURCE

(75) Inventor: Yasuhiro Yamamoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 224 days.

(21) Appl. No.: 12/194,759

(22) Filed: Aug. 20, 2008

(65) Prior Publication Data

US 2009/0052880 A1    Feb. 26, 2009

(30) Foreign Application Priority Data

Aug. 23, 2007   (JP)  .............. 2007-216975

(51) Int. Cl.
    *G03B 17/00*     (2006.01)
    *H04N 5/228*     (2006.01)

(52) U.S. Cl. ............. 396/55; 396/277; 348/208.5; 348/208.16

(58) Field of Classification Search ............ 348/208.16, 348/208.5
See application file for complete search history.

(56) References Cited

U.S. PATENT DOCUMENTS

| | | | |
|---|---|---|---|
| 7,302,172 B2 | 11/2007 | Seo | |
| 7,355,630 B2 | 4/2008 | Uenaka et al. | |
| 7,400,823 B2 | 7/2008 | Kakiuchi | |
| 7,400,824 B2 | 7/2008 | Seo | |
| 7,403,295 B2 | 7/2008 | Seo | |
| 2001/0022619 A1* | 9/2001 | Nishiwaki ............... 348/208 |
| 2005/0168585 A1 | 8/2005 | Uenaka et al. | |
| 2005/0206735 A1 | 9/2005 | Seo | |
| 2005/0244152 A1 | 11/2005 | Seo | |
| 2005/0270379 A1 | 12/2005 | Seo | |
| 2007/0172219 A1 | 7/2007 | Kosako et al. | |
| 2007/0212040 A1* | 9/2007 | Kosako ............... 396/55 |

FOREIGN PATENT DOCUMENTS

JP     2001-311976 A     4/2000

OTHER PUBLICATIONS

English language Abstract of JP 2001-311976, Apr. 28, 2000.

* cited by examiner

*Primary Examiner*—W. B. Perkey
*Assistant Examiner*—Bret Adams
(74) *Attorney, Agent, or Firm*—Greenblum & Bernstein, P.L.C.

(57) ABSTRACT

An imaging system, comprising a battery checker, an anti-shake controller, and an image processor, is provided. The imaging system is able to carry out mechanical and electronic anti-shake functions. The battery checker detects available charge of a battery. The anti-shake controller orders the mechanical anti-shake function to be carried out if the available charge is greater than a first threshold value. The anti-shake controller orders the electronic anti-shake function to be carried out if the available charge is less than the first threshold value. The image processor treats an image captured in a second area in the imaging area as a captured moving image while the mechanical anti-shake function is carried out. The size of the second area is second size, which is determined according to the available charge.

5 Claims, 7 Drawing Sheets

IMAGING SYSTEM WITH MECHANICAL AND ELECTRICAL ANTI-SHAKE MODE DETERMINED ACCORDING TO REMAINING AVAILABLE CHARGE OF POWER SOURCE

BACKGROUND OF THE INVENTION

1. Field of the Invention

The present invention relates to an imaging system and a camera that reduces the influence of a hand shake on a moving image when the moving image is captured.

2. Description of the Related Art

A mechanical anti-shake function and an electronic anti-shake function are known as methods of reducing the influence of a hand shake on a moving image when the moving image is captured. In the mechanical anti-shake function, the influence of a hand shake is reduced by detecting the shake of an imaging apparatus and moving the photographic optical system or imaging device so that the hand shake movement can be canceled. In the electronic anti-shake function, the influence of a hand shake is lowered by detecting the shake of an imaging apparatus and extracting the image from a partial area of the effective imaging area of the imaging device according to the degree of the detected hand shake.

More power is consumed in performing the mechanical anti-shake function than the electronic anti-shake function because additional power is drawn in order to run the motor which cancels the shake. On the other hand, a moving image captured using the electronic anti-shake function is less detailed than one captured with the mechanical anti-shake function because the captured image consist of a reduced part of the effective imaging area.

In dealing with this problem, Japanese Unexamined Patent Publication No. 2001-311976 teaches the switching from the mechanical anti-shake function to the electronic anti-shake function when the charge level of the battery drops below a threshold value.

However, if the switch from the mechanical anti-shake function to the electronic anti-shake function is performed during the capture of a moving image, the size of the captured scene will suddenly change. An observer watching the displayed moving image may find this transition awkward.

SUMMARY OF THE INVENTION

Therefore, an object of the present invention is to provide an imaging system and a digital camera which captures a moving image without suddenly changing the size of the captured scene when the method of anti-shake reduction is changed.

According to the present invention, an imaging system, comprising a battery checker, an anti-shake controller, and an image processor, is provided. The imaging system is able to carry out mechanical and electronic anti-shake functions. The influence of a shake on a captured image is canceled by moving a photographic optical system or an imaging device in the mechanical anti-shake function. The influence of the shake on a captured moving image is canceled by shifting a first area of a first size in the effective imaging area of the imaging device according to the shake in the electronic anti-shake function. The first area captures the moving image. The first area is a partial area of the effective imaging area of the imaging device. The first size is constant. The battery checker detects the available charge of a battery. The battery provides power to drive the imaging system. The anti-shake controller orders the mechanical anti-shake function to be carried out if the available charge is greater than a first threshold value. The anti-shake controller orders the electronic anti-shake function to be carried out if the available charge is less than the first threshold value. The image processor treats an image captured in a second area in the effective imaging area as a captured moving image while the mechanical anti-shake function is carried out. The size of the second area is second size. The second size is greater than or equal to the first size. The second size is determined according to the available charge.

Further, the image processor designates the first area as the second area if the available charge, at the moment the imaging device commences capturing an image, is greater than a second threshold value. The second threshold value is greater than the first threshold value.

Further, the image processor adjusts the second size so as to approach the first size as the available charge approaches the first threshold value while the mechanical anti-shake function is in effect.

Further, the imaging system comprises an optical system adjuster that adjusts the focal length of the photographic optical system in proportion to the second size when said image processor makes the second size approach the first size.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with reference to the embodiment shown in the drawings.

Figure 1:
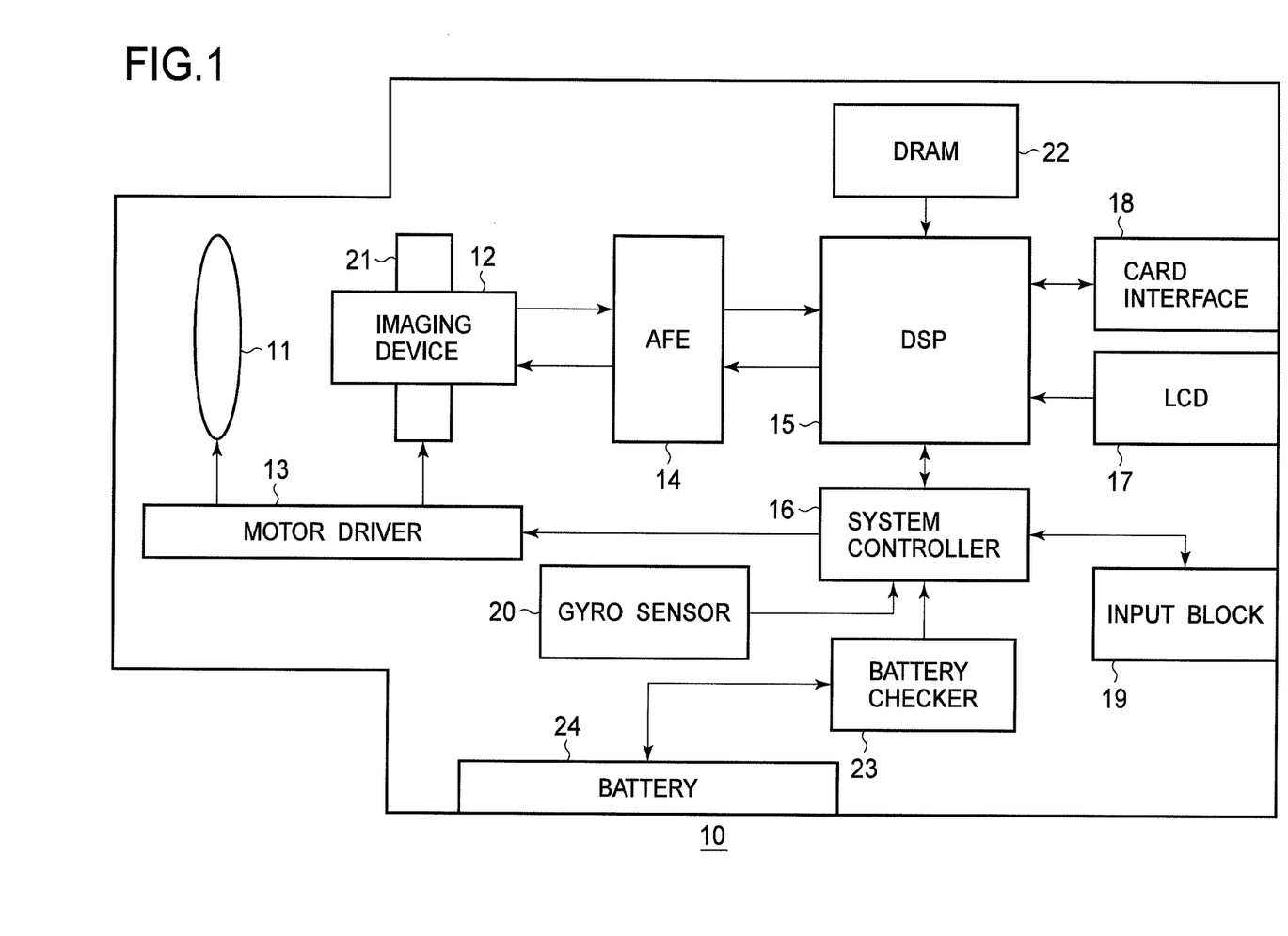
FIG. 1 is a block diagram showing the internal structure of a digital camera having an imaging system of an embodiment of the present invention.

In FIG. 1, a digital camera 10 (imaging system) comprises a photographic optical system 11, an imaging device 12, a motor driver 13, an analog front end (AFE) 14, a digital signal processor (DSP) 15 (image processor), a system controller 16 (anti-shake controller), a liquid crystal display (LCD) 17, a card interface 18, an input block 19, a gyro sensor 20, and other components. The vertical direction in FIG. 1 is regarded as the vertical direction of the digital camera 10 and the direction perpendicular to the vertical direction in FIG. 1 is regarded as the optical axis direction of the digital camera 10.

The photographic optical system 11 is optically connected to the imaging device 12. An optical image of an object through the photographic optical system 11 is incident on the light-receiving surface of the imaging device 12. The imaging device 12 is, for example, a CCD area sensor. When the imaging device 12 captures the optical image of the object upon its light-receiving surface, the imaging device 12 generates an image signal corresponding to the captured optical image.

The photographic optical system 11 comprises plural lenses, including a focusing lens (not depicted) and a zoom lens (not depicted). The focusing lens and the zoom lens are moved by a lens motor (not depicted) along the optical axis of the photographic optical system 11. The lens motor is driven by the motor driver 13.

The imaging device 12 is supported by an anti-shake mechanism 21 so that the imaging device 12 is movable on a plane perpendicular to the optical axis of the photographic optical system 11. The anti-shake mechanism 21 comprises an anti-shake motor (not depicted), which moves the imaging device 12 in two directions on the plane perpendicular to the optical axis of the photographic optical system 11. The anti-shake motor is driven by the motor driver 13.

The gyro sensor 20 is connected to the system controller 16. The gyro sensor 20 detects the direction and quantity of shake of the digital camera 10 on the plane perpendicular to the optical axis direction. Vector data corresponding to the detected shake direction and the detected shake quantity is sent to the system controller 16.

The system controller 16 calculates the direction and distance to move the imaging device 12 in order to cancel the shake. The data corresponding to the calculated direction and distance is sent to the motor driver 13. The motor driver 13 drives the anti-shake motor based on the received data, thereby canceling the shake of the imaging device 12 and its influence on the captured image. The mechanical anti-shake function explained above is carried out when capturing optical still and moving images.

The imaging device 12 is electrically connected to the DSP 15 via the AFE 14. A clock signal is sent from the DSP 15 to the AFE 14. The AFE 14 generates an imaging device driving signal for driving the imaging device 12 based on the received clock signal. The imaging device driving signal is sent to the imaging device 12. The imaging device 12, which is driven based on the imaging device driving signal, generates an image signal.

The generated image signal is sent to the AFE 14. The AFE 14 carries out correlated double sampling and gain adjustment on the image signal. In addition, the image signal is converted into digital image data and then sent to the DSP 15.

The DSP 15 is connected to a dynamic random access memory (DRAM) 22, which is used as a work memory for data processing. The image data received by the DSP 15 is temporarily stored in the DRAM 22. The DSP 15 carries out predetermined data processing on the image data stored in the DRAM 22.

In addition, before predetermined data processing, the DSP 15 determines a practical image area within the effective imaging area of the imaging device 12. The DSP 15 treats an image captured in the practical image area as an image for displaying or recording. The DSP 15 carries out predetermined data processing on the image data corresponding to the image captured in the practical image area. In addition, the size and/or the location of the practical image area is determined according to the selected operation mode of the digital camera 10 and the selected anti-shake function, as explained below.

The DSP 15 is connected to the LCD 17. The image data, having undergone predetermined data processing, is sent to the LCD 17. An image, corresponding to the image data received by the LCD 17 can thereby be displayed on the LCD 17.

The DSP 15 is connected to a card interface 18. When a release operation is carried out, the image data, having undergone predetermined data processing, is stored in a memory card (not depicted) which is connected to the card-interface 18.

The system controller 16 controls each component including the DSP 15 of the digital camera 10. The system controller 16 is connected to the input block 19 where a user inputs operational commands for handling the digital camera 10. The input block 19 comprises a release button (not depicted), a multi-functional cross-key (not depicted), and other buttons.

The system controller 16 is connected to a battery checker 23. The battery checker 23 detects the voltage of the battery 24, which can be connected to and removed from the digital camera 10 and which provides power to drive all components of the digital camera 10. The system controller 16 calculates the amount of available charges in the battery 24 based on the detected voltage of the battery 24.

The digital camera 10 has a still image mode, a moving image mode, a display mode, and a set-up mode. In the still image mode, the digital camera 10 can capture a still image. In the moving image mode, the digital camera 10 can capture a moving image. In the display mode, a still image or a moving image captured previously can be displayed on the LCD 17. In the set-up mode, various user-adjustable parameters can be changed.

In the still image mode, the DSP 15 designates the effective imaging area as the practical image area. In the moving image mode, the DSP 15 determines the practical image area according to the selected anti-shake function, as explained below.

In the moving image mode, the electronic anti-shake function explained below can be carried out as well as the mechanical anti-shake function described above. When the moving image mode is selected to be carried out, the size of the practical image area is fixed to a first size and the location of the practical image area in the effective imaging area is shifted every frame in order to counteract hand shake. In addition, the first size is constant and smaller than the size of the effective imaging area.

In the usual moving image mode, an optical image incident on the imaging device 12 is captured in the effective imaging area every 1/30 second. When the electronic anti-shake function is carried out in the moving image mode, a pursuit process is carried out in addition to image capture. The pursuit process is carried out for the image data corresponding to an image captured at a specified partial area of the effective imaging area in order to calculate a motion vector for the digital camera 10.

Figure 2:
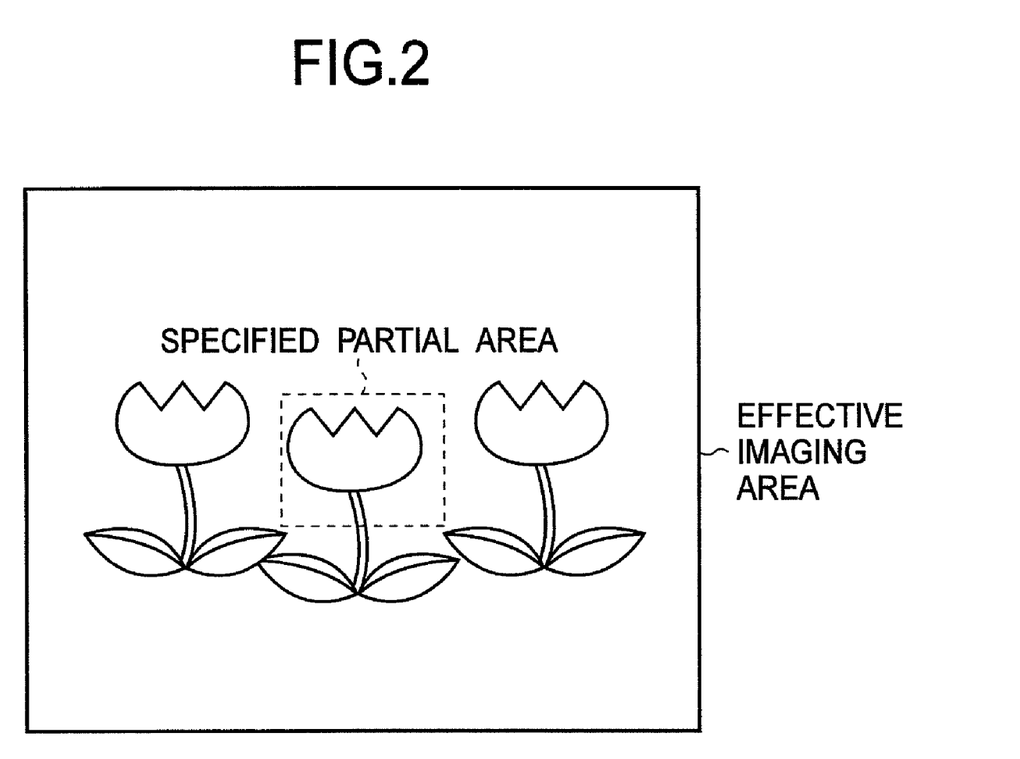
FIG. 2 is a diagram showing the location of the specified partial area in the effective imaging area.
Figure 3:
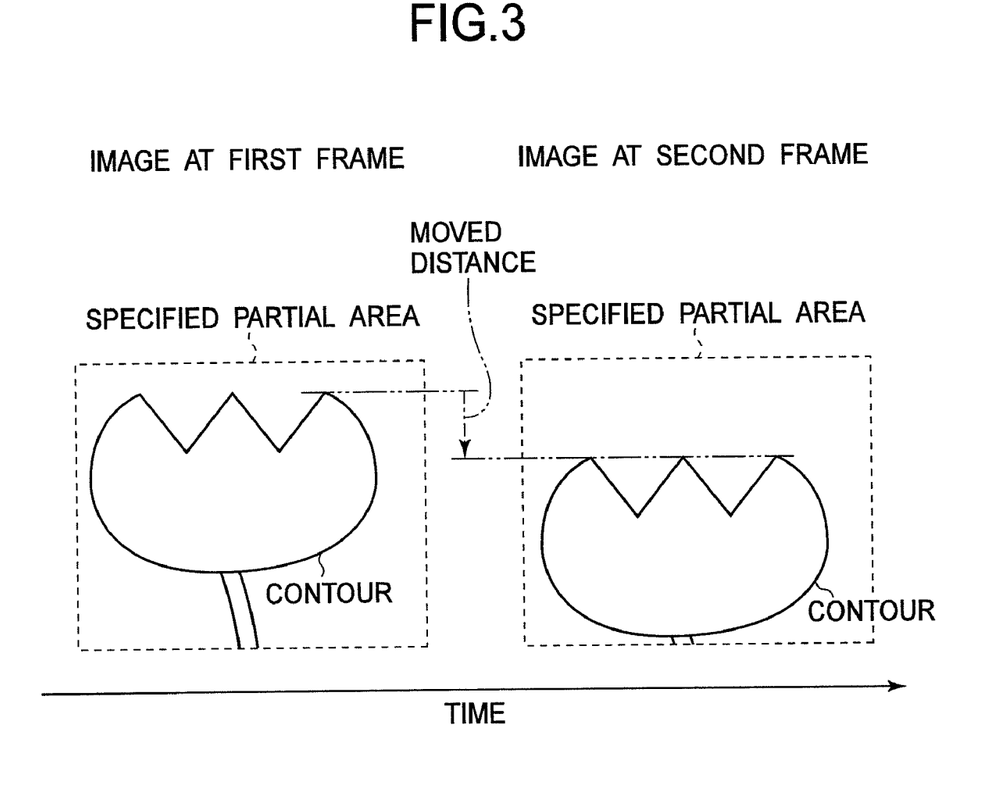
FIG. 3 is a diagram illustrating the pursuit process.

In the pursuit process, as shown in FIG. 2, the contour of an object captured in the specified partial area in the first frame soon after the pursuit process commences is detected using feature extraction such as luminance extraction. The DSP 15 determines the location to which the contour extracted in the first frame has moved in the second frame (see FIG. 3). The DSP 15 calculates the motion vector of the optical image of the pursued subject and treats it as the motion vector of the digital camera 10.

Figure 4:
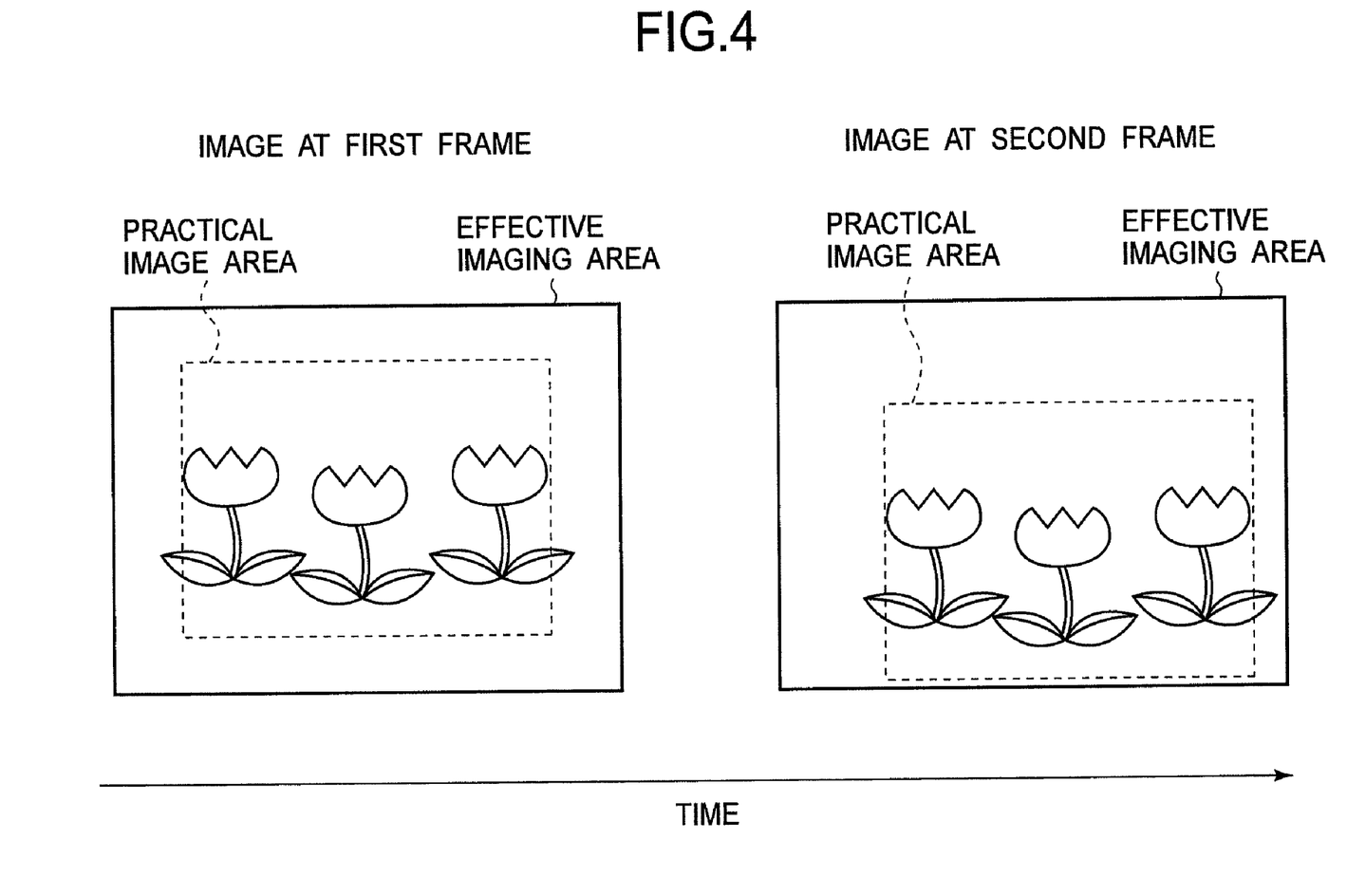
FIG. 4 is a diagram illustrating the electronic anti-shake function.

Once the motion vector of the digital camera 10 has been calculated, the partial area which has moved from the practical image area in the first frame is selected as the practical image area in the second frame, as shown in FIG. 4. The partial image data corresponding to the partial image captured in the selected practical image area in the second frame is regarded as the image to be captured, extracted, and stored in the memory card. An influence of a hand shake on a moving image is removed by repeating the calculation of the motion vector for the digital camera 10, selecting the new practical image area, and storing the partial image data.

Next, anti-shake functions carried out in the moving image mode are explained. In the moving image mode, one of a mechanical anti-shake function, an electronic anti-shake function, a first auto anti-shake function, or a second anti-shake auto function can be carried out. The anti-shake function to be carried out is selectable in the set-up mode.

If the first or second auto anti-shake functions are selected, the system controller 16 carries out either the mechanical or electronic anti-shake functions according to the charge level in the battery 23. In both the first and second auto anti-shake functions, when the available charge in the battery 23 is greater than a first threshold value, the mechanical anti-shake function is carried out. On the other hand, when the available charge in the battery 23 drops below the first threshold value, the electronic anti-shake function is carried out.

In addition, when the mechanical portion of the first or second auto anti-shake function is carried out, the DSP 15 determines the practical image area according to the available charge in the battery 23, as explained below.

In the first auto anti-shake function, the practical image area is determined according to the charge level in the battery 23 at the moment of entering the moving image mode. If the available charge in the battery 23 is greater than a second threshold value which is greater than the first threshold value, at the moment of entering the moving image mode, the practical image area is set equal to the effective imaging area. On the other hand, if the charge level in the battery 23 is more than the first threshold value but less than the second threshold value, a partial area of a so-called first size, with fixed location in the effective imaging area is set as the practical image area.

In the second auto anti-shake function, the practical image area is changed according to the charge level in the battery 23 continuously detected in the moving image mode. Here, a so-called third threshold value greater than the first threshold value is in effect rather than the second threshold value. In the moving image mode, when the charge level in the battery 23 is greater than the third threshold value, the practical image area is set equal to the effective imaging area. On the other hand, if the charge level in the battery 23 is greater than the first threshold value but less than the third threshold value, the size of the practical image area is gradually adjusted in proportion to the charge level in the battery 23 so that the size of the practical image approaches the first size as the available charge approaches the first threshold value.

Figure 5:
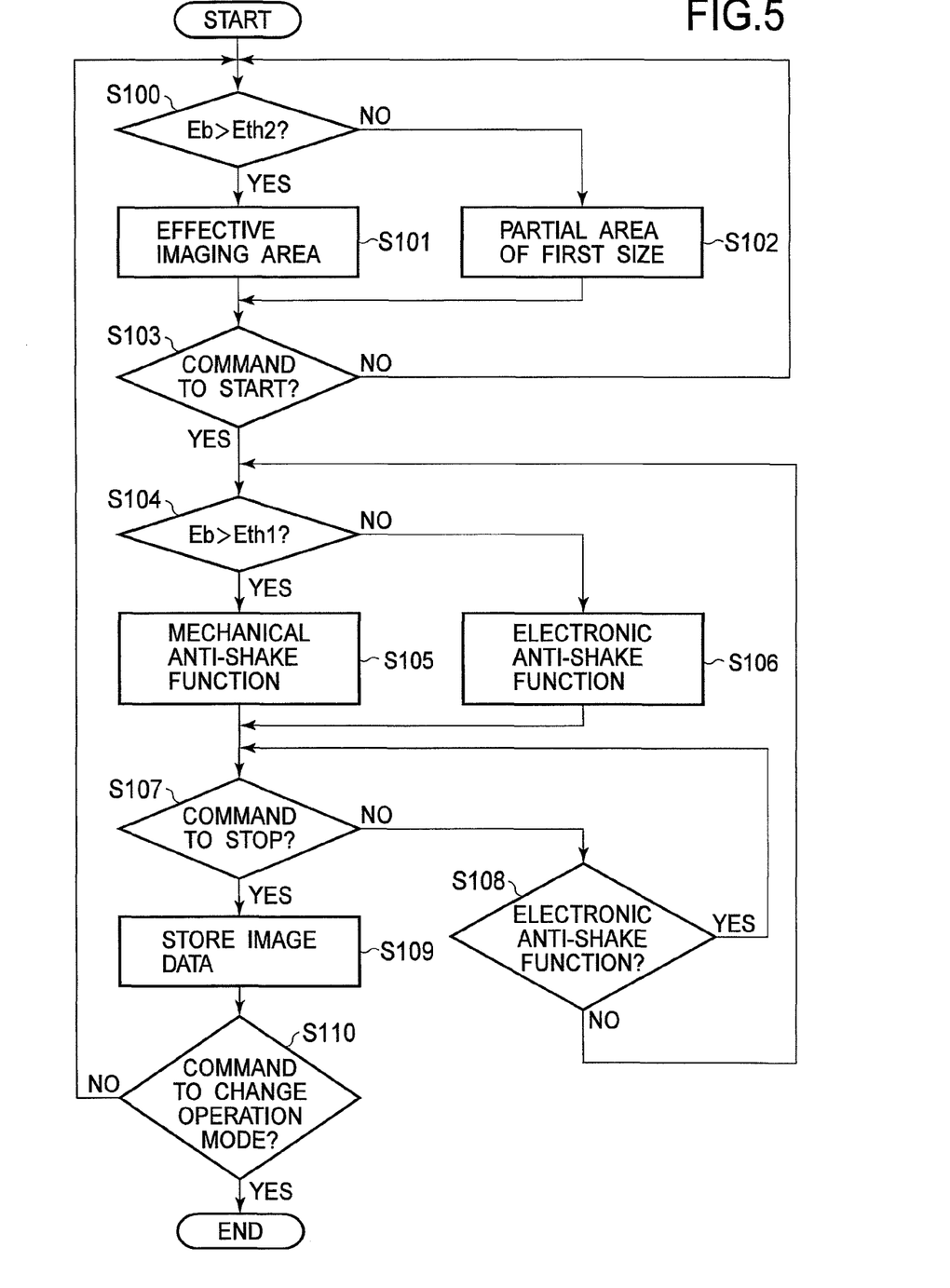
FIG. 5 is a flowchart illustrating the process in the first auto anti-shake function as carried out by the DSP and the system controller.
Figure 6:
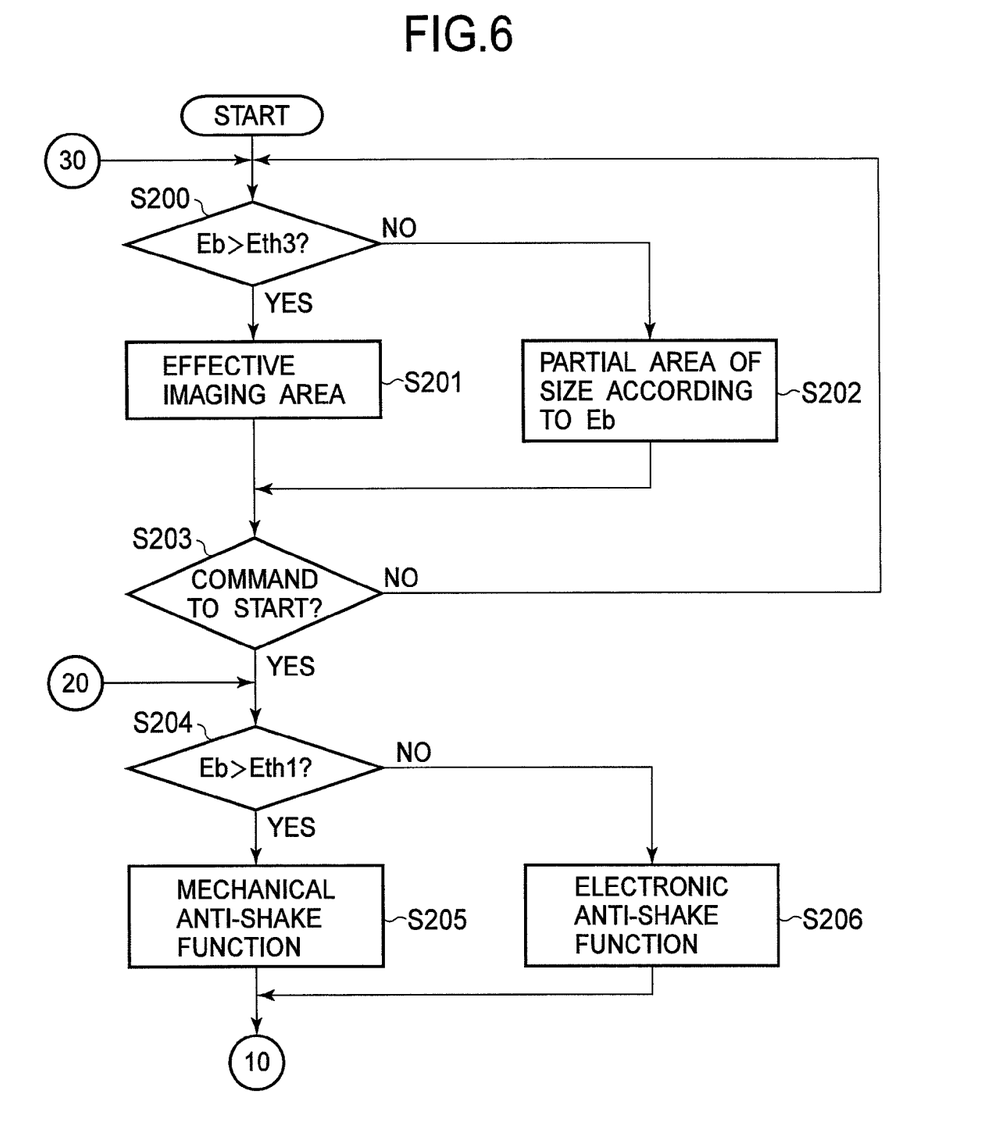
FIG. 6 is the first of two flowcharts illustrating the process in the second auto anti-shake function as carried out by the DSP and the system controller.
Figure 7:
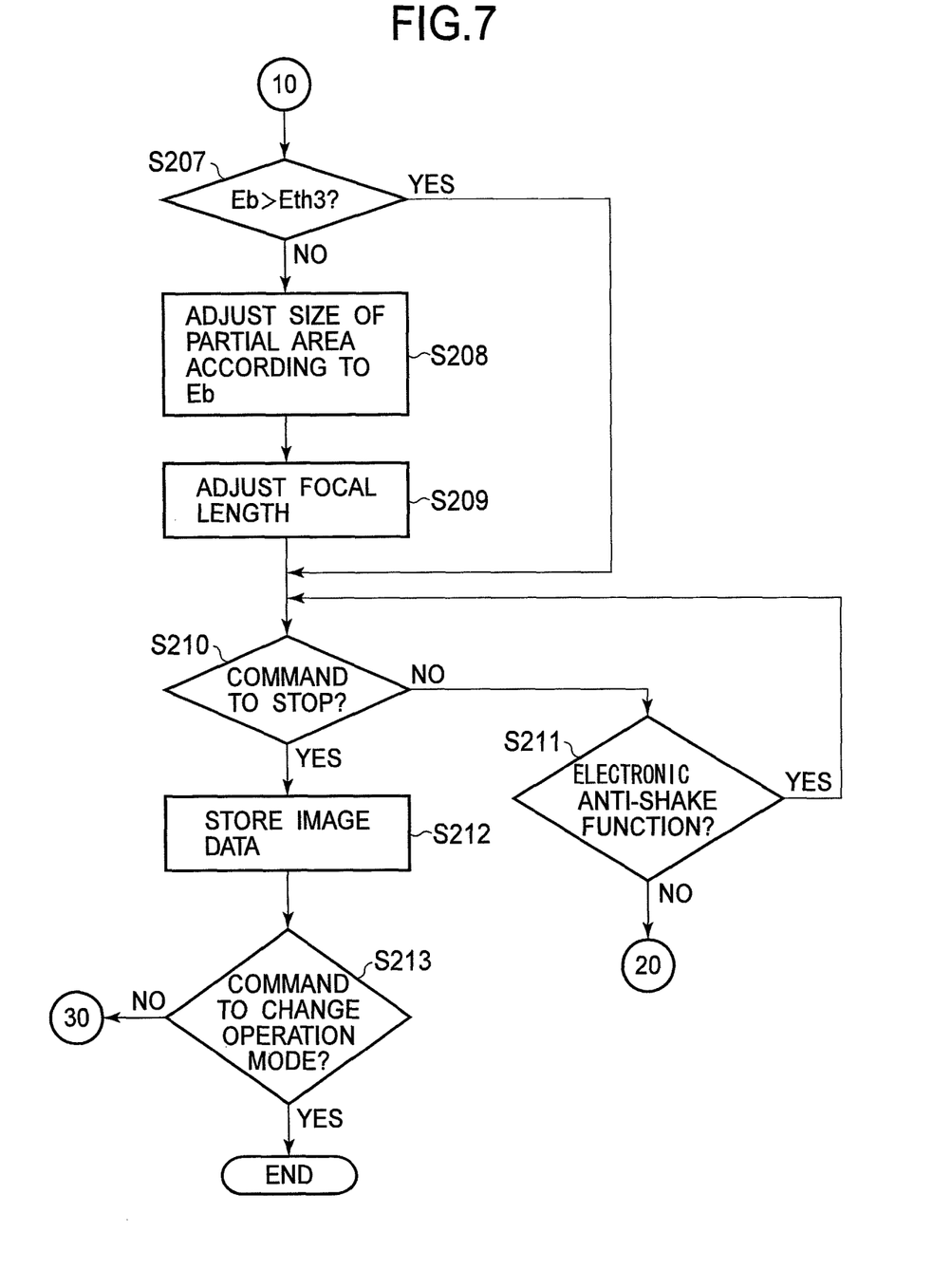
FIG. 7 is the second of two flowcharts illustrating the process in the second auto anti-shake function as carried out by the DSP and the system controller.

Next, the processes carried out by the DSP 15 and the system controller 16 in the first and second auto anti-shake functions are explained using the flowcharts of FIGS. 5-7. FIG. 5 is a flowchart illustrating the process in the first auto anti-shake function as carried out by the DSP and the system controller. FIGS. 6 and 7 are flowcharts illustrating the process in the second auto anti-shake function as carried out by the DSP and the system controller.

The first auto anti-shake function commences when the operation mode of the digital camera 10 is switched to the moving image mode so long as the first auto anti-shake function has been selected in advance. In addition, a moving image is not captured until image capture is triggered by an initiation command.

At step S100, the system controller 16 orders the battery checker 23 to detect the voltage of battery 24. In addition, the system controller 16 determines whether or not the available charge in the battery 24, hereinafter referred to as Eb, is greater than the second threshold value, hereinafter referred to as Eth2. If the Eb is greater than the Eth2, the process proceeds to step S101. If the Eb is not greater than the Eth2, the process proceeds to step S102.

At step S101, the DSP 15 sets the practical image area equal to the effective imaging area. At step S102, the DSP 15 determines a partial area of the first size as the practical image area. After completion of step S101 or S102, the process proceeds to step S103.

At step S103, the system controller 16 determines whether or not a capture initiation command has been input to the input block 19. If the capture initiation command has not been input, the process returns to step S100 and steps S100-S103 are repeated until the capture initiation command is input. If the capture initiation command has been input, the process proceeds to step S104.

At step S104, the system controller 16 orders the battery checker 23 to detect the voltage of battery 24 again. In addition, the system controller 16 determines whether or not the Eb is greater than the first threshold value, hereinafter referred to as Eth1. If the Eb is greater than the Eth1, the process proceeds to step S105. If the Eb is not greater than the Eth1, the process proceeds to step S106.

At step S105, the system controller 16 in cooperation with the motor driver 13 carries out the mechanical anti-shake function. Alternatively, at step S106, the system controller 16 orders the DSP 15 to carry out the electronic anti-shake function. After completion of step S105 or S106, the process proceeds to step S107.

At step S107, the system controller 16 determines whether or not a capture termination command has been input to the input block 19. If the capture termination command has not been input, the process proceeds to step S108. If the capture termination command has been input, the process proceeds to step S109.

At step S108, the system controller 16 determines whether or not the electronic anti-shake function is carried out. If the electronic anti-shake function is carried out, the process returns to step S107 and steps S107 and S108 are repeated until an input of the capture termination command is detected at step S107. If the mechanical anti-shake function is carried out rather than the electronic anti-shake function, the process returns to step S104 and steps S104-S108 are repeated.

At step S109, the DSP 15 stores the image data corresponding to the captured moving image in the memory card. At step S110, the system controller 16 checks for the issuance of an operational command to change operation mode from the moving image mode. If mode-change command has not been input, the process returns to step S100 and steps S100-S110 are repeated. If mode-change command has been input, the first auto anti-shake function terminates.

The second auto anti-shake function commences when the operation mode of the digital camera 10 is changed to the moving image mode under the condition that the second auto anti-shake function is selected in advance. In addition, a moving image is not captured until a capture initiation command has been input even if the operation mode is changed to the moving image mode.

At step S200, the system controller 16 orders the battery checker 23 to detect the voltage of battery 24. In addition, the system controller 16 determines whether or not the Eb is greater than the third threshold value, hereinafter referred to as Eth3. If the Eb is greater than the Eth3, the process proceeds to step S201. If the Eb is not greater than the Eth3, the process proceeds to step S202.

At step S201, the DSP 15 sets the practical image area equal to the effective imaging area. At step S102, the DSP 15 sets the practical image area equal to a partial area of size proportional to the Eb. After completion of step S201 or S202, the process proceeds to step S203.

At step S203, the system controller 16 determines whether or not a capture initiation command has been input to the input block 19. If the capture initiation command has not been input, the process returns to step S200 and steps S200-S203 are repeated until the capture initiation command has been input. If the capture initiation command has been input, the process proceeds to step S204.

At step S204, the system controller 16 orders the battery checker 23 to detect the voltage of battery 24 again. In addition, the system controller 16 determines whether or not the Eb is greater than the Eth1. If the Eb is greater than the Eth1, the process proceeds to step S205. If the Eb is not greater than the Eth1, the process proceeds to step S206.

At step S205, the system controller 16, in cooperation with the motor driver 13, carries out the mechanical anti-shake function. Otherwise, at step S206, the system controller 16 orders the DSP 15 to carry out the electronic anti-shake function. After completion of step S205 or S206, the process proceeds to step S207.

At step S207, the system controller 16 determines whether or not the Eb detected at step S204 is greater than the Eth3. If the Eb is greater than the Eth3, the process skips steps S208 and S209 and proceeds to step S210. If the Eb is not greater than the Eth3, the process proceeds to step S208.

At step S208, the DSP 15 sets the practical image area equal to a partial area whose size is predetermined in proportion to the Eb. If only the size of the practical image area were varied at step S208, the size of the captured scene would vary. In order not to change the size of a captured scene despite varying the size of the practical image area, at step S209, the system controller 16 orders the motor driver 13 to adjust the focal length of the photographic optical system 11 according to the determined size of the practical image area. After adjusting the focal length, the process proceeds to step S210.

At step S210, the system controller 16 determines whether or not a capture termination command has been input to the input block 19. If the capture termination command has not been input, the process proceeds to step S211. If the capture termination command has been input, the process proceeds to step S212.

At step S211, the system controller 16 determines whether or not the electronic anti-shake function is carried out. If the electronic anti-shake function is carried out, the process returns to step S210 and steps S210 and S211 are repeated until the input of the capture termination command is detected at step S210. If the mechanical anti-shake function is carried out rather than the electronic anti-shake function, the process returns to step S204 and steps S204-S211 are repeated.

At step S212, the DSP 15 stores image data corresponding to the captured moving image in the memory card. At step S213, the system controller 16 determines whether or not a mode-change command. If a mode-change command has not been input, the process returns to step S200 and steps S200-S213 are repeated. If a mode-change command has been input, the second auto anti-shake function terminates.

In the above embodiment, the size of the captured scene does not vary after switching from the mechanical anti-shake function to the electronic anti-shake function.

In particular, in the first auto anti-shake function, if the Eb is low on the commencement of the moving image mode, the size of the practical image area is fixed regardless of whether mechanical or electronic anti-shake functions are carried out. Consequently, the detail in moving images captured in both mechanical and electronic anti-shake functions is constant. Thus, the use does not experience any awkward transitions.

In particular, in the second auto anti-shake function, the size of the practical image area is gradually reduced from that of the effective imaging area to the first size and the focal length is varied according to the size of the practical image area in proportion to the Eb. Consequently, the size of a captured scene does not change but the displayed moving image gradually gets coarser. Thus, the user does not experience any awkward transitions.

The focal length of the photographic optical system 11 is adjusted according to the determined size of the practical image area in the second auto anti-shake function in the above embodiment. However, the focal length might also not be automatically adjusted. Unless the focal length is adjusted, the change in the size of the practical image area will be gradual. Consequently, the user does not experience any awkward transitions because the size of captured scene varies gradually.

The digital camera 10 has both the first and second auto anti-shake functions available in the above embodiment. However, the digital camera 10 might also have just one of the first and second auto anti-shake functions.

The influence of hand shake on a captured image is canceled by the movement of imaging device 12 perpendicularly to the optical axis of the photographic optical system 11 in the above embodiment. However, the influence may also be canceled by mounting a correction lens in the photographic optical system 11 and moving the correction lens perpendicularly to the optical axis of the photographic optical system 11.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2007-216975 (filed on Aug. 23, 2007), which is expressly incorporated herein, by reference, in its entirety.

The invention claimed is:

1. An imaging system, said imaging system being able to carry out mechanical and electronic anti-shake functions, the influence of a shake on a captured image being canceled by moving a photographic optical system or an imaging device in said mechanical anti-shake function, the influence of said shake on a captured moving image being canceled by shifting a first area of a first size in the effective imaging area of said imaging device according to said shake in said electronic anti-shake function, said first area capturing said moving image, said first area being a partial area of said effective imaging area, said first size being constant, said imaging system comprising:

a battery checker that detects the available charge of a battery, said battery providing power to drive said imaging system;

an anti-shake controller that orders said mechanical anti-shake function to be carried out if said available charge is greater than a first threshold value, and orders said electronic anti-shake function to be carried out if said available charge is less than said first threshold value; and an image processor that treats an image captured in a second area in said effective imaging area as a captured moving image while said mechanical anti-shake function is carried out, the size of said second area being second size, said second size being greater than or equal to said first size, and said second size being determined according to said available charge.

2. An imaging system according to claim 1, wherein said image processor designates said first area as said second area if said available charge, at the moment said imaging device commences capturing an image, is greater than a second threshold value, and said second threshold value being greater than said first threshold value.

3. An imaging system according to claim 1, wherein said image processor adjusts said second size so as to approach said first size as said available charge approaches said first threshold value while said mechanical anti-shake function is in effect.

4. An imaging system according to claim 3, further comprising an optical system adjuster that adjusts the focal length of said photographic optical system in proportion to said second size when said image processor makes said second size approach said first size.

5. A digital camera, said digital camera being able to carry out mechanical and electronic anti-shake functions, the influence of a shake on a captured image being canceled by moving a photographic optical system or an imaging device in said mechanical anti-shake function, the influence of said shake on a captured moving image being canceled by shifting a first area of a first size in the effective imaging area of said imaging device according to said shake in said electronic anti-shake function, said first area capturing said moving image, said first area being a part of said effective imaging area, said first size being constant, said digital camera comprising:

a battery checker that detect the available charge of a battery, said battery providing power to drive said digital camera;

an anti-shake controller that orders said mechanical anti-shake function to be carried out if said available charge is greater than a first threshold value, and orders said electronic anti-shake function to be carried out if said available charge is less than said first threshold value; and an image processor that treats an image captured in a second area in said effective imaging area as a captured moving image while said mechanical anti-shake function is carried out, the size of said second area being second size, said second size being greater than or equal to said first size, and said second size being determined according to said available charge.

* * * * *